United States Patent
Wase et al.

(10) Patent No.: US 10,696,918 B2
(45) Date of Patent: Jun. 30, 2020

(54) CONTINUOUS PURIFICATION OF MOTOR OILS USING A THREE-PHASE SEPARATOR

(71) Applicant: ALFA LAVAL CORPORATE AB, Lund (SE)

(72) Inventors: Claes Wase, Tullinge (SE); Mats Englund, Stockholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 573 days.

(21) Appl. No.: 15/102,130

(22) PCT Filed: Dec. 4, 2014

(86) PCT No.: PCT/EP2014/076614
§ 371 (c)(1),
(2) Date: Jun. 6, 2016

(87) PCT Pub. No.: WO2015/086434
PCT Pub. Date: Jun. 18, 2015

(65) Prior Publication Data
US 2016/0304805 A1   Oct. 20, 2016

(30) Foreign Application Priority Data
Dec. 10, 2013   (EP) ..................................... 13196489

(51) Int. Cl.
*C10M 175/00*   (2006.01)
*B01D 21/00*   (2006.01)
(Continued)

(52) U.S. Cl.
CPC ... *C10M 175/0091* (2013.01); *B01D 21/0042* (2013.01); *B01D 21/01* (2013.01);
(Continued)

(58) Field of Classification Search
CPC ...... C10M 175/0091; C10M 175/0075; C10M 175/0016; C10M 175/02; C10M 175/0058;
(Continued)

(56) References Cited

U.S. PATENT DOCUMENTS 2,320,106 A * 5/1943 South ............... C10M 175/0016
                                                208/180
2,907,517 A * 10/1959 Ziherl ...................... B04B 1/20
                                                494/11
(Continued)

FOREIGN PATENT DOCUMENTS

CN       101687203 A    3/2010
EP       0142810 A2     5/1985
(Continued)

OTHER PUBLICATIONS

English translation of the Japanese Notice of Reasons for Rejection for Japanese Application No. 2016-538072, dated Jun. 26, 2017.

*Primary Examiner* — Charles Cooley
(74) *Attorney, Agent, or Firm* — Birch, Stewart, Kolasch & Birch, LLP

(57) ABSTRACT

A method for continuous purification of motor lubricant oil includes circulating lubricant oil between a motor lubricant oil tank and a motor; transporting contaminated lubricant oil from the motor lubricant oil tank in a cleaning loop. The transport in the cleaning loop includes adding at least one liquid separation aid to contaminated lubricant oil; supplying contaminated lubricant oil to a three-phase centrifugal separator; continuously separating contaminants from the lubricant oil in the separator and continuously discharging a first liquid phase including purified lubricant oil from a liquid light phase outlet of the separator, continuously discharging a second liquid phase including solid contaminants from a liquid heavy phase outlet of the separator and (Continued)

continuously discharging a sludge phase from a sludge outlet by the aid of a conveyor screw of the three-phase separator. The method further includes transporting the first liquid phase including purified oil back to the lubricant oil tank. The present invention further provides a system for carrying out the method.

17 Claims, 5 Drawing Sheets

(51) Int. Cl.
  *B01D 21/01* (2006.01)
  *B01D 21/26* (2006.01)
  *B04B 5/00* (2006.01)
  *B04B 5/10* (2006.01)
  *B04B 11/02* (2006.01)
  *B04B 13/00* (2006.01)
  *C10M 175/02* (2006.01)

(52) U.S. Cl.
  CPC ............ *B01D 21/262* (2013.01); *B04B 5/005* (2013.01); *B04B 5/10* (2013.01); *B04B 11/02* (2013.01); *B04B 13/00* (2013.01); *C10M 175/0016* (2013.01); *C10M 175/0058* (2013.01); *C10M 175/0075* (2013.01); *C10M 175/02* (2013.01); *B04B 2013/006* (2013.01)

(58) Field of Classification Search
  CPC .......... B04B 13/00; B04B 5/005; B04B 5/10; B04B 11/02; B04B 2013/006; B01D 21/262; B01D 21/01; B01D 21/0042; B01D 21/2405
  USPC ...... 210/778, 193, 519, 521; 494/13, 23, 29, 494/53
  See application file for complete search history.

(56) References Cited

U.S. PATENT DOCUMENTS

| | | | | |
|---|---|---|---|---|
| 2,919,848 A * | 1/1960 | Howe | ................ | B04B 1/20 494/42 |
| 3,424,375 A * | 1/1969 | Maurer | ................ | B04B 1/20 494/11 |
| 4,773,992 A * | 9/1988 | Dietrick | ................ | B04B 1/14 210/112 |
| 5,494,579 A * | 2/1996 | Robatel | ................ | B04B 1/20 210/380.1 |
| 5,989,415 A * | 11/1999 | Hirs | ................ | B01D 17/0208 210/138 |
| 6,056,685 A * | 5/2000 | Nelson | ................ | B04B 1/20 494/53 |
| 7,410,457 B2 * | 8/2008 | Heinrich | ................ | B04B 1/08 494/70 |
| 8,715,510 B2 * | 5/2014 | Daly | ................ | C02F 1/008 210/101 |
| 2004/0014614 A1 * | 1/2004 | Burrington | ................ | C10M 165/00 508/287 |
| 2004/0112816 A1 * | 6/2004 | Smith | ................ | B01D 21/0018 210/202 |
| 2006/0086676 A1 * | 4/2006 | Smith | ................ | B01D 21/0018 210/803 |
| 2006/0217254 A1 | 9/2006 | Wase | | |
| 2008/0153726 A1 * | 6/2008 | Damm | ................ | C10L 1/02 508/391 |
| 2010/0144508 A1 * | 6/2010 | Ridderstrale | ................ | B04B 1/08 494/50 |
| 2013/0157833 A1 * | 6/2013 | Konigsson | ................ | B01D 53/96 494/5 |
| 2013/0210601 A1 * | 8/2013 | Zheng | ................ | B04B 11/02 494/53 |

FOREIGN PATENT DOCUMENTS

| | | | | |
|---|---|---|---|---|
| GB | 607638 | | 9/1948 | |
| GB | 607638 A | * | 9/1948 | ....... C10M 175/0091 |
| GB | 836993 | | 6/1960 | |
| JP | 60-164251 A | | 8/1985 | |
| JP | 63-256111 A | | 10/1988 | |
| JP | 2002-276323 A | | 9/2002 | |
| JP | 2006-509857 A | | 3/2006 | |
| JP | 2010-526654 A | | 8/2010 | |
| RU | 2330878 C2 | | 8/2008 | |
| RU | 2423165 C1 | | 7/2011 | |
| WO | WO 93/15843 A1 | | 8/1993 | |
| WO | WO 99/65610 A1 | | 12/1999 | |
| WO | WO 2004/039922 A1 | | 5/2004 | |
| WO | WO 2010/053035 A1 | | 6/2004 | |
| WO | WO 2008/140378 A1 | | 11/2008 | |
| WO | WO 2011/053224 A1 | | 5/2011 | |
| WO | WO 2015/086434 A1 | | 6/2015 | |

* cited by examiner

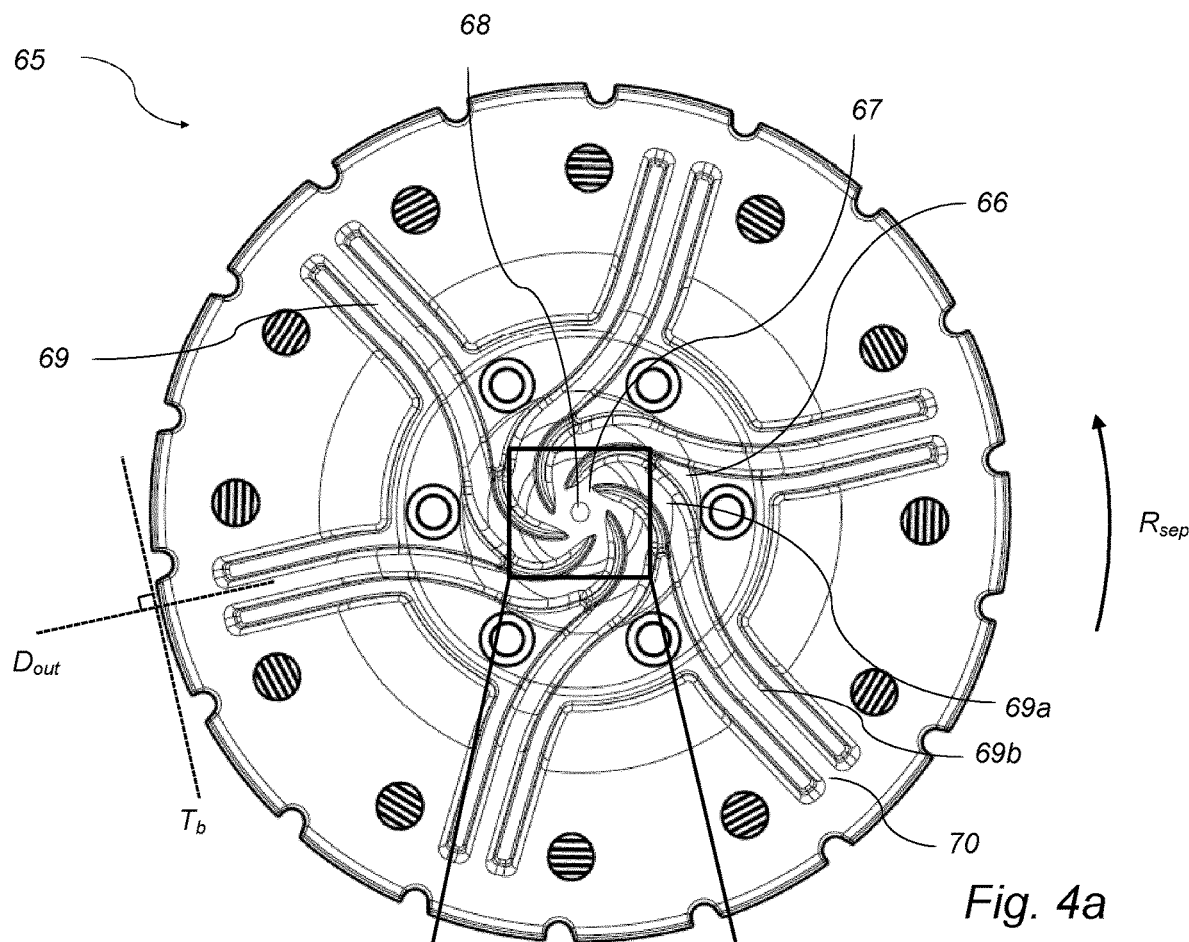
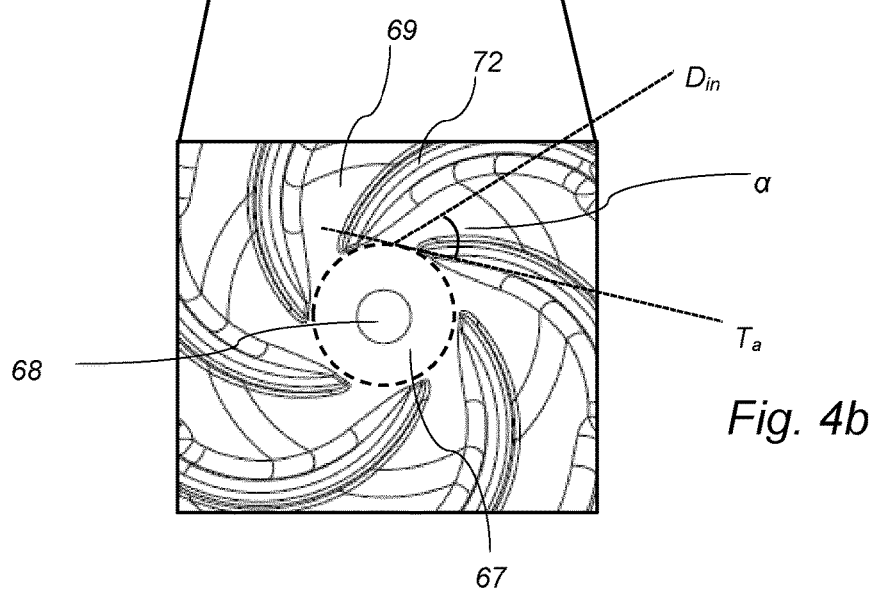
Fig. 4a
Fig. 4b

CONTINUOUS PURIFICATION OF MOTOR OILS USING A THREE-PHASE SEPARATOR

FIELD OF THE INVENTION

The present invention relates to a system and method for purifying motor lubricant oil, and in particular to methods and systems for continuous purification of motor oil using a centrifugal separator.

BACKGROUND OF THE INVENTION

Cleaning of lubricating oils for diesel engines on board ships or in diesel power stations may involve problems since contaminants have a very low density, have a small particle size and are usually kept in suspension within the oil by detergent and dispersant additives present in the lubricating oil.

Conventional separation and filter technologies may remove larger contaminants but the smaller particles are usually harder to remove. This means that oil in use in the diesel engine is often contaminated with combustion residues such as soot, inorganic reaction residues such as calcium sulphate from sulphuric acid and alkaline additives. Further, the typical concentration of pentane is about 0.5-1% in the used oil. The high amount of insoluble increases the viscosity of the lubricating oil and thereby reduces the lubricating and cleaning properties.

SUMMARY OF THE INVENTION

A main object of the present invention is to provide a method and system having improved properties for reducing the content of small contaminant particles in the lubrication oil A further object of the present invention is to provide a method and system for continuous purification of motor lubricant oil.

As a first aspect of the invention, there is provided a method for continuous purification of motor lubricant oil comprising
  circulating lubricant oil between a motor lubricant oil tank and a motor;
  transporting contaminated lubricant oil from the motor lubricant oil tank in a cleaning loop, the transport in the cleaning loop comprising
    adding at least one liquid separation aid to contaminated lubricant oil;
    supplying contaminated lubricant oil with said liquid separation aid to a three-phase centrifugal separator;
    continuously separating contaminants from the lubricant oil in the separator and continuously discharging a first liquid phase comprising purified lubricant oil from a liquid light phase outlet of the separator, continuously discharging a second liquid phase comprising solid contaminants from a liquid heavy phase outlet of the separator and continuously discharging a sludge phase from a sludge outlet by the aid of a conveyor screw of the three-phase separator, and
    transporting the first liquid phase comprising purified oil back to the lubricant oil tank.

In analogy, as a second aspect of the invention, there is provided a system for continuous purification of motor lubricant oil, the system comprising
  a lubricant oil tank, a motor and means for circulating lubricant oil between the oil tank and a motor;
  a three-phase centrifugal separator for separating contaminants from lubricant oil, the separator comprising a rotor enclosing a separation space with a stack of separating discs, a separator inlet for contaminated lubricant oil extending into the separation space, a liquid light phase outlet for purified lubricant oil extending from the separation space, a liquid heavy phase outlet extending from the separation space, wherein the separator is further provided with a conveyor screw which is enclosed in the rotor and arranged for conveying a sludge phase towards and out of a sludge outlet of the separator;
  means for transporting contaminated lubricant oil from the lubricant oil tank to the separator inlet and means for transporting purified oil from the liquid light phase outlet of the separator back to the lubricant oil tank,
  means for adding at least one liquid separation aid to the contaminated oil upstream of the separator inlet.

The motor lubricant oil is a composition for lubrication of various internal combustion engines, such as a diesel engine. The oil may be for lubricating moving parts but also for cleaning, cooling, inhibiting corrosion of the motor. The motor lubricant oils may be derived from petroleum-based and non-petroleum-synthesized chemical compounds. The oils may be pure mineral oils, half- or full-synthetic oils, or animal or vegetable oils with or without additives The contaminants in the oil may comprise soot and nanoparticles The lubricant oil tank is thus a tank for the lubricant oil, such as a buffer tank. The tank may have a volume of above 10 $m^3$, such as about 20 $m^3$.

Contaminated lubricant oil is supplied to a three-phase centrifugal separator. A three-phase centrifugal separator refers to a centrifugal separator arranged for separating a liquid mixture into three-phases, such as into a liquid light phase of a first density, a liquid heavy phase of a second density that is higher than the first density, and a sludge phase. The sludge phase may be more or less solid phase, but may contain small amounts of liquid. The rotor of the three-phase separator further encloses a conveyor screw. This screw may be arranged to be driven at a rotational speed differing from the rotational speed of the rotor. The conveyor screw is for conveying the sludge phase, i.e. the separated phase with density higher than the liquid phases, towards a separator sludge outlet. The sludge outlet may be provided on a smaller radius from the rotational axis of the rotor than the outer radius of the separation space. The conveyor screw may be further arranged to convey the pollutant phase radially inwards and towards the sludge separator outlet. Due to this arrangement, the concentration of particles in the sludge phase can be very high. The three-phase separator may be suspended only at its one upper end, and the sludge outlet may be located at the end opposite the upper end.

The separating discs or plates may be frustoconical or have any other suitable shape.

The three-phase separator may be arranged for operating under force of at least 5000 G, such as under a force within the range from about 5000 G to about 7000 G.

The present invention is based on the insight that a three-phase separator may be used in a cleaning loop for cleaning contaminants from motor lubricant oil. By addition of at least one liquid separation aid prior to separation in the separator, a liquid phase comprising the separation aid and contaminants may be discharged as a liquid phase, cleaned motor lubricant oil may be discharged as a second liquid phase, whereas solids accumulated in the periphery of the separation chamber of the three-phase separator may continuously be conveyed by the screw conveyor towards and out from sludge outlet. Thus, the method and system provides for continuous purification of the oil, even when the motor to which the tank is connected to is still running, and the separator may run continuously without stops for e.g. cleaning the interior of the separator.

In other words, the present invention provides for continuously circulating lubricant oil from a motor lubricant oil tank to the motor in a motor loop and at the same time continuously circulating lubricant oil to a separator in a separation loop.

Since the method and system provides for better cleaning of the oil, the motor may run more efficiently, there is less wear of the motor and the motor lubricant oil consumption may be reduced. Thus, the motor may be saved due to less abrasive particles in the cylinder lining, the filter consumption may decrease and the lifetime of the motor lubricant oil may drastically increase.

In embodiments of the invention, at least 50% of the solid contaminants are discharged in the second liquid phase from the liquid heavy phase outlet of the separator. This may be an advantageous due to the nature of the separator, i.e. that is it a three-phase separator comprising both separation discs and a screw conveyor, as defined according to the first aspect above.

As an example, at least 75%, such as at least 95%, such as about 95-97%, such as at least 97%, of the solid contaminants may be discharged in the second liquid phase from the liquid heavy phase outlet of the separator.

Thus, a major fraction of the contaminants may be discharged in the liquid phase of high density, and the conveyor screw may be used for discharging any sludge phase of high density that may accumulate or build-up at the periphery of the separation chamber.

In embodiments of the invention, the liquid separation aid has a density larger than that of the lubricant oil.

The liquid separation aid may comprise a polymer. For example, the polymer may be polyhydroxy alkoxylate with a density of 1.0-1.1 $g/cm^3$ at 40° C.

The liquid separation aid may contain additives which give the oil the desired properties for the intended application, in which the density of the oils is within the interval of 0.85-1.05 $g/cm^3$ at 40° C. The choice of the liquid separating aid may further depend on the motor lubricant oil which is to be purified. The choice of separating aid may also be dependent on the kind of contaminants.

The liquid separation aid may or may not contain water or be soluble in water. The separation aid may further be insoluble in oil. Depending on the amount of contaminated particles, a larger or smaller amount of separating aid is added. The separating aid may contain substances causing flocculation of the contaminant particles, which result in heavier particles that are more easily removable by centrifugal separation. The separating aid may also attract or bind the particles by way of chemical or surface chemical bonds.

In embodiments of the invention, the at least one liquid separation aid is labelled. The separation aid may for example be labelled with a radioactive label comprising a radioisotope, or any other suitable dye, such as a fluorescent compound (fluorophore) or a non-fluorescent compound (chromophore) that is detected spectroscopically. Thus, the separation aid may be labelled with a label selected from the group consisting of a radioisotope, a fluorophore and a chromophore.

The liquid separation aid may comprise a polymer that is labelled. The liquid separation aid may thus comprise a polymer that is labelled with a radioactive label, a fluorophore or a chromophore.

Using a labelled liquid separation aid is advantageous in that it provides a control that no or a little amount of liquid separation aid is present in the purified lubricant oil that is discharged via the liquid light phase outlet, i.e. it may control that no or little separation aid is present in the motor lubricant oil that is then transported to the motor.

Consequently, the method may comprise measuring the amount of labelled liquid separation aid when transporting the first liquid phase comprising purified oil back to the lubricant oil tank. If the amount is above a predetermined value, it may indicate that there is a malfunction in the separator or the separation process.

The system may comprise means for measuring the amount of labelled liquid separation aid during transport of purified oil back to the lubricant oil tank. The means may for example comprise a detector for measuring ionizing radiation from a radioisotope, such as a Geiger counter. The means may comprise a detector for spectroscopically detecting a fluorophore or chromophore, depending on the type of labelled liquid separation aid.

In embodiments of the invention, the step of adding at least one liquid separation aid to contaminated lubricant oil further comprises mixing the contaminated lubricant oil and the liquid separation aid before supply to the three-phase centrifugal separator.

Thus, the system may further comprise a mixer for mixing the added liquid separation aid to the contaminated oil upstream of the separator inlet.

The mixer may be a static mixer or a dynamic mixer.

This may further increase the separation efficiency in the separator. However, additional liquid separation aid may be added at the inlet to the separator. The inlet itself may provide sufficient mixing of the contaminated motor lubricant oil and the separation aid.

Thus, the liquid separation aid and the oil may be mixed in some kind of mixer connected to the inlet of the two phase separator or in a separate mixing operation prior to the purification.

In embodiments of the invention, the flow rate in the circulation of lubricant oil between the motor lubricant oil tank and the motor is more than 50 times higher than the flow rate in the cleaning loop, such as more than 65 times higher, such as more than 80 times higher, such as more than 100 times higher.

Accordingly the separator should operate as a "kidney" in the oil system, and a larger flow of motor lubricant oil is continuously circulated between the tank and the motor, whereas a smaller flow is continuously circulated in the cleaning loop.

The flow rate may proportional to the amount of liquid flowing.

Thus, in embodiments, the volume of liquid flowing in the in the circulation of lubricant oil between the motor lubricant oil tank and the motor is more than 50 times higher than the flow rate in the cleaning loop, such as more than 65 times higher, such as more than 80 times higher, such as more than 100 times higher.

In embodiments of the invention, the temperature of the contaminated lubricant oil is at least 70° C. during separation in the three-phase separator.

Preferably the temperature is within the range from about 80 to 98° C., more preferred the temperature is within the range from about 80 to 95° C. As an example, the motor lubricant oil may have a temperature of about 95° C. The temperature of the contaminated lubricant oil may be dependent on the temperature of the motor, i.e. during the running of the motor heat is produced and thus the contaminated lubricant oil is heated to the temperature which is created by the motor.

In embodiments of the invention, the step of transporting contaminated lubricant oil from the motor lubricant oil tank in the cleaning loop comprises withdrawing contaminated lubricant oil from a first position in the lubricant oil tank and further wherein the step of circulating lubricant oil between the motor lubricant oil tank and the motor comprises withdrawing lubricant oil from a second position, other than the first position, in the lubricant oil tank.

Further, the first liquid phase comprising purified oil may transported back to the lubricant oil tank to a position near the second position of the oil tank.

Moreover, contaminated lubricant oil may be transported from the motor to the oil tank near the first position.

Consequently, the system may be arranged such that lubricant oil is withdrawn from a first position in the lubricant oil tank to the cleaning loop. This first position may be arranged at the bottom of the tank or at one side of the tank. Further, motor lubricant oil that is to be transported to the motor may then be withdrawn from another, second, position. This second position may be located at the top of the tank or at a side opposite the first position. Consequently, if the first position is at the bottom of the tank, the second position may be at the top and if the first position is at one side of the tank, the second position may be on a side opposite the side at which the first position is located.

Furthermore, in the loop between the oil tank and the motor, oil may be withdrawn from the tank from a position near the second position and oil that has passed through the motor, i.e. contaminated oil, may be returned to a position near the first position in the oil tank. Such a configuration may facilitate that the most contaminated oil in the tank is transferred to the separator and further that the oil being transferred to the motor is the cleanest oil in the tank.

In embodiments of the invention, the step of circulating lubricant oil between the motor lubricant oil tank and a motor comprises cooling the lubricant oil before the oil is supplied to the motor.

Thus, the system may comprise a cooler for cooling motor lubricant oil that is transported from the tank to the motor. In addition, the system may comprise a filter, such as an automatic full flow filter, downstream of the cooler but upstream the motor. The filter may further be a Moatti-filter. This may further aid in purifying the oil that is supplied to the motor. Contaminants from the filter may be returned to the motor lubricant tank via a filter reject line, e.g. to a position within the tank from which motor lubricant oil is withdrawn to the cleaning loop.

In embodiments of the invention, the method is continuously carried out during running of the motor to which the lubricant oil tank is connected to.

The system may further comprise the motor connected to the lubricant oil tank. The motor may have an effect of at least 1 MW. The motor may further be a diesel engine. Furthermore, the motor may be a two stroke engine or a four stroke engine.

The method may further comprise addition of an additive that neutralizes acid contaminants within the motor lubricant oil. Such an addition may be to the motor lubricant tank. Thus, the system may comprise means for addition of an additive that neutralizes acid contaminants within the oils connected to the motor lubricant tank.

However, the addition may be performed by adding fresh oil that comprises such additive to the system, such as to the tank.

The additive that neutralizes acid contaminants within the oils may be a TBN (total base number) additive.

The method may comprise measuring the concentration of at least one additive that neutralizes acid contaminants within the motor lubricant oil, and if the concentration is below a predetermined value, the method may comprise adding at least one additive that neutralizes acid contaminants within the motor lubricant oil.

The addition may be to the motor lubricant tank.

Further, the three-phase separator may comprise an inlet device for smoothly accelerating the incoming oil and separation aid. This may be advantageous in that it further facilitates the separation of oil and particles.

The inlet pipe for the incoming oil and separation aid may thus discharge at such an inlet device. The inlet device, or distributor, may gently accelerate the liquid when guided via inlet passages to the separation chamber. The inlet device may comprise a central conical receiving structure arranged around the axis of rotation R. This structure may comprise a central receiving zone for receiving the oil and separation aid from n inlet pipe. The inlet device may further comprise inlet channels for directing the liquid mixture from said receiving zone to the separation chamber. The inlet channels may extend from the periphery of the receiving zone and spiral down the outer surface of said conical receiving structure.

The inlet channel or channels may twist all the way down to the bottom of the conical receiving structure. Thus, the inlet channel or channels are twisted and/or may form the beginning of an S-shaped structure. The channel may spiral less than a complete or full turn around the conical structure. As an example, the at least one inlet channel may spiral less than half a full turn around the conical structure, such as about a quarter of a turn around the conical structure. A twisted inlet channel is advantageous e.g. when the inlet pipe of the separator is stationary and the inlet device rotates, i.e. it aids in accelerating the liquid gently.

As an example, the inlet device may comprise at least two inlet channels, such as three, four, five or six, inlet channels. The inlet device may comprise at least six inlet channels, such as at least ten inlet channels.

As an example, the inlet channels of the inlet device may spiral clockwise from the central receiving zone down the outer surface of the conical receiving structure if the inlet device is for rotation in an anti-clockwise direction around rotational axis R and vice versa.

The inlet device may have a bowl-like shape in which the central conical receiving structure located in the centre within said bowl-like shape and extending from the bottom of said bowl-like shape. The inlet channels may extend radially from the bottom of said conical receiving structure and up the inner sides of said bowl-like structure. The inlet device may have a substantially circular cross section and the inlet channels may be located at the outlet to the separation chamber in a direction that is substantially perpendicular to the tangent of the periphery of the circular cross section. Having the inlet channel or channels leaving the outlet in a direction that is substantially perpendicular to the tangent of the circular periphery of the inlet device is advantageous in that it gives the liquid a preferable acceleration when entering the separation chamber.

The present invention further provides for a cleaning kit for a lubricant oil tank, comprising
a three-phase centrifugal separator for separating contaminants from lubricant oil, the separator comprising a rotor enclosing a separation space with a stack of separating discs, a separator inlet for contaminated lubricant oil extending into the separation space, a liquid light phase outlet for purified lubricant oil extending from the separation space, a liquid heavy phase outlet extending from the separation space, wherein the separator is further provided with a conveyor screw which is enclosed in the rotor and arranged for conveying a sludge phase towards and out of a sludge outlet of the separator;
means for transporting contaminated lubricant oil from the lubricant oil tank to the separator inlet and means for transporting purified oil from the liquid light phase outlet of the separator back to the lubricant oil tank,
means for adding at least one liquid separation aid to the contaminated oil upstream of the separator inlet.

Such a kit may thus be added to an existing motor lubricant oil tank, which may or may not already be connected to another cleaning system.

BRIEF DESCRIPTION OF THE DRAWINGS

FIGS. 4a and 4b show a top view and a detailed view of an inlet device that may be used in the three-phase centrifugal separator of the system.

DETAILED DESCRIPTION

The system and method according to the present disclosure will be further illustrated by the following description of an embodiment with reference to the accompanying drawings.

Figure 1:
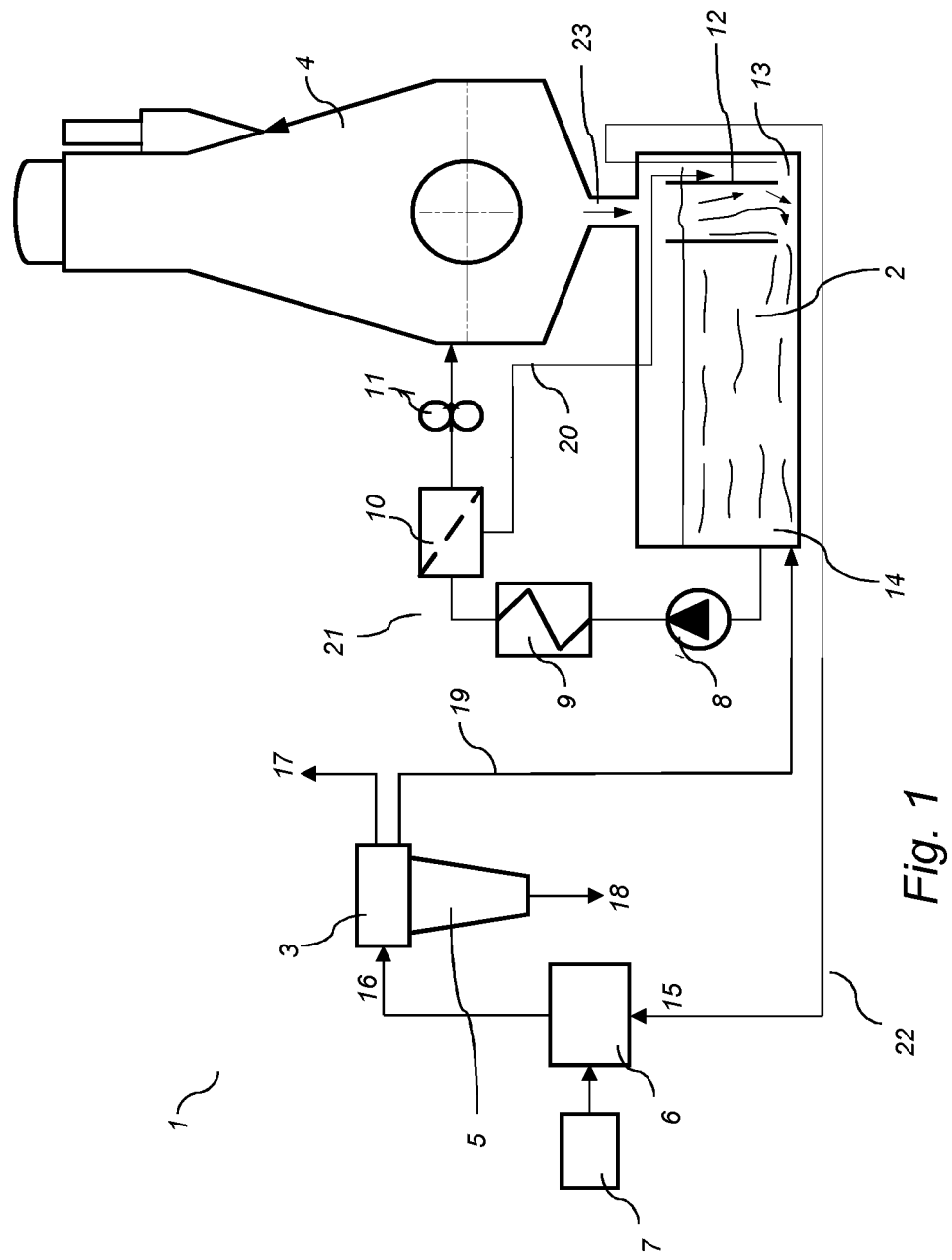
FIG. 1 shows a system according to an embodiment of the invention.

FIG. 1 shows a continuous cleaning system 1 according to an embodiment. The system comprises a motor lubricant oil tank 2, which comprises motor lubricant oil for motor 4. To the tank 2, a motor loop 21 is arranged for circulating motor lubricant oil between the tank 2 and the motor 4.

A cleaning loop 22 is further connected to the oil tank 2. In the cleaning loop 22, a three-phase separator 3 is connected to a motor lubricant oil tank 2. Contaminated lubricant oil is withdrawn to the cleaning loop via line 15 from a first position 13 of the oil tank 2. Liquid separation aid is dosed to the contaminated lubricant oil via dosage pump 7, and the separation aid and the contaminated oil is blended in mixer 15. The liquid separation aid may suitably have a density larger than that of the lubricant oil, thus forming a heavy phase together with the contaminating particles. After blending, the oil and separation aid is transferred to the inlet of the separator 3 via line 16.

The three-phase separator 3 is continuously separating off contaminant particles together with the liquid separation aid as a liquid heavy phase that is discharged via an outlet into line 17. Sediments and solid particles are further continuously discharged or conveyed out via a conveyor screw 5 via an outlet in the bottom of the separator 3, as illustrated by arrow 18. As an example, the major fraction of the contaminant particles may be discharged as a liquid heavy phase, whereas a minor fraction of contaminant particles may be discharged as a sludge phase via conveyor screw 3. The liquid light phase, i.e. the purified lubricant oil is discharged from a liquid light phase outlet of separator 2 and is further transferred back to the motor lubricant oil tank 2 via line 19, thereby closing the cleaning loop 22. Clean oil is transferred back to a second position 14 in the oil tank 2, and the second position 14 is on the opposite side to the first position 13.

Discharged liquid heavy phase from separator in line 17, as well as the discharged sludge phase illustrated by arrow 18, may be collected and further disposed. The three-phase separator 3 thus acts as a kidney in the system. Since the purification process is continuously on going during the operation of the motor the temperature of the circulating oil is at least 70° C., preferably the temperature is within the range from about 80 to about 98° C.

In the motor loop 21, lubricant oil is continuously transferred from the motor lubricant oil system tank 2 to the motor from a position close to the second position 14 of the oil tank. Pump 8 drives the transport of oil from the tank 2 to the motor 4, and the lubricant oil is passed through cooler 9 and filter 10, before reaching the motor 4. The filter 10 may be an automatic full flow filter, and there is also a safety indicator 11 for indicating the status of the filter, i.e. to further make sure that as clean oil as possible is transferred to the motor 4. Particles etc. that has stuck in the filter may be transferred via filter reject line 20 back to the tank, e.g. close to the first position 13 from which motor lubricant oil is withdrawn to the cleaning loop. Oil from the motor is transferred to the oil tank via line 23, and there may be means 12 for directing the oil from the motor to a position at the bottom of the tank, such as close to the first position 13 from which motor lubricant oil is withdrawn to the cleaning loop. The directing means 12 may for example be baffles. This may further provide for that the most contaminated lubricant oil is withdrawn to the cleaning loop 13. The pair of baffles 12 are provided on one side of the tank receiving contaminated oil to be cleaned, creating a first portion having baffles and a second portion not having baffles within the tank. Contaminated lubricant oil is supplied to the three-phase centrifugal separator 5 from an inlet between a side of the lubricant oil tank and the pair of baffles and oil is returned from the motor 4 to the tank through an outlet having a longitudinal axis located between the pair of baffles 12.

During cleaning of the lubricant oil in the system 1, any amount of additive present in the motor lubricant oil that neutralizes acid contaminants may be decreased. Therefore, the system may include means for adding such additive, e.g. a TBN (total base number) additive, to the system, such as to the tank 2. Alternatively, such additive may be added manually to the tank. However, the addition may be performed by adding fresh oil that comprises such additive to the system, such as to the tank.

Figure 2:
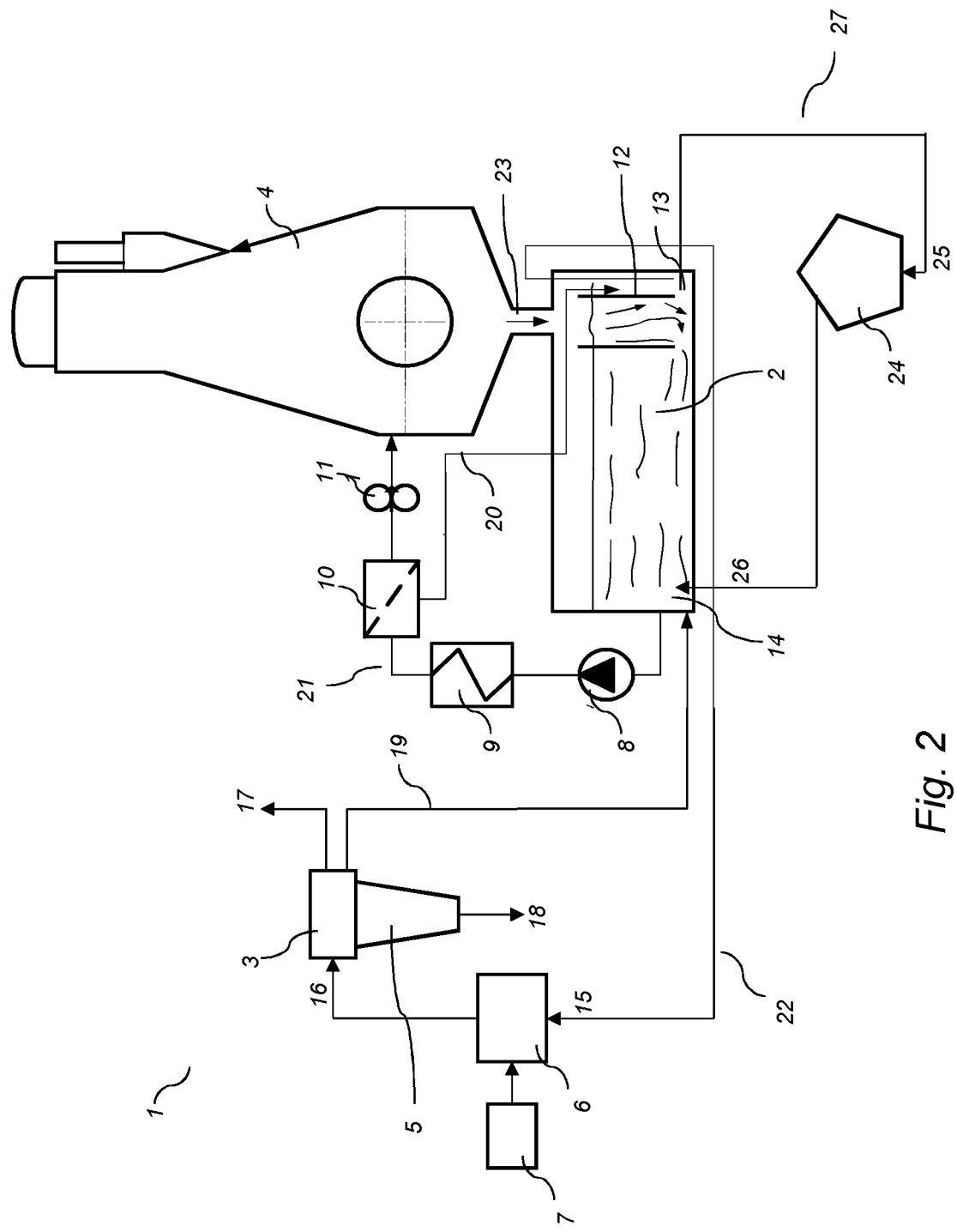
FIG. 2 shows a system according to an embodiment of the invention.

FIG. 2 shows a further embodiment of the system 1. The system 1 of FIG. 2 is the same as in FIG. 1, but further comprising an additional cleaning loop 27 connected to the oil tank 2. The additional cleaning loop 27 comprises a separator 24, a line 25 for transporting contaminated motor lubricant oil from the first position 13 of the tank 2 to the separator 27, and a line 26 for transporting clean oil from the separator 24 back to the second position 26 of the oil tank 2. The separator 24 may be a conventional separator comprising a rotor enclosing a separation space with a stack of separating discs or a set of separating plates. The separating discs or plates may be frustoconical or have any other suitable shape. The centrifugal separator 24 may further comprise a separator inlet for contaminated oil extending into said separation space, and may further comprise a first separator outlet for cleaned scrubber fluid extending from said separation space, and a second separator outlet for the pollutant phase extending from said separation space. The second outlet may extend from the radially outermost region of the separation space and be in the form of discharge ports or nozzles. Such discharge ports can be arranged to be opened intermittently, during short periods, for discharge of a separated phase with density higher than the cleaned scrubber fluid, i.e. the pollutant phase. As one alternative the discharge ports may be arranged to be opened during a period suitable for total discharge so that to substantially empty the bowl of scrubber fluid and pollutant phase.

FIG. 2 illustrates that the three-phase separator may function in connection with other separators. As an alternative, the separator 24 may be arranged in the cleaning loop 22 upstream of the three-phase separator, such as upstream of the mixer 6. The three-phase separator may then further aid in cleaning the cleaned phase discharged from the separator 24.

FIG. 2 further demonstrates that the components of the cleaning loop 22 may function as a separate kit that may be added to a cleaning system that only involves the additional cleaning loop 27. Thus, the three-phase separator, the mixer 6, the dosage pump 7 may be connected to a system that already comprises a cleaning loop 27, to further increase the efficiency of the motor lubricant oil cleaning.

Figure 3:
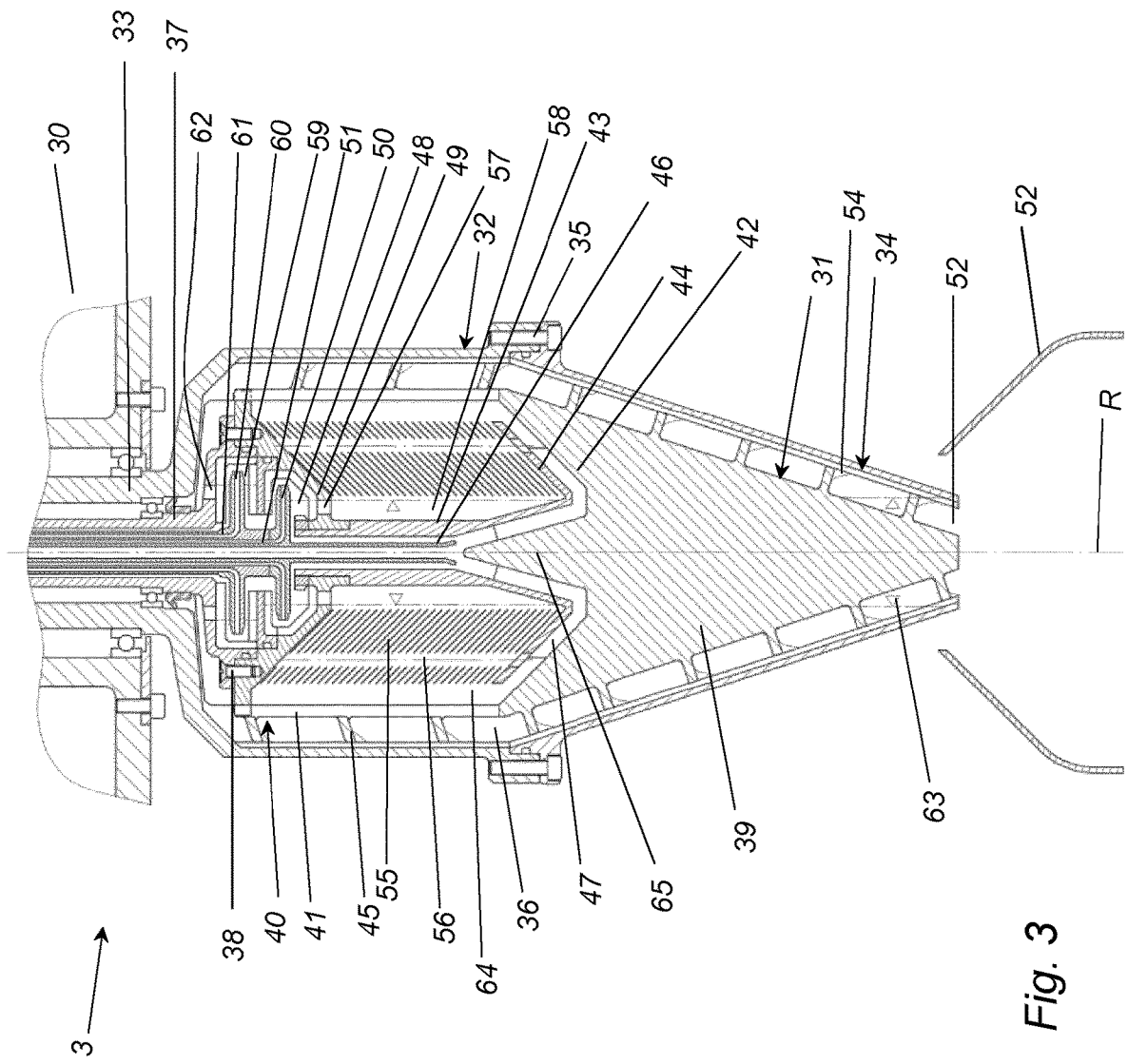
FIG. 3 shows a sectional view of a three-phase centrifugal separator used in the system.

FIG. 3 shows in more detail a three-phase separator 3 that may be used in the system 1. The centrifugal separator 3 comprises a rotor body 30 which is rotatable at a certain speed about a vertical axis of rotation R, and a screw conveyor 31 which is arranged in the rotor body 30 and rotatable about the same axis of rotation R but at a speed which differs from the rotation speed of the rotor body 30.

The centrifugal separator is intended to be suspended vertically in a manner indicated by WO 99/65610. The device necessary for suspending and driving the centrifugal separator is therefore not described here.

The rotor body 30 has an essentially cylindrical upper rotor portion 32 comprising or connected to a hollow rotor shaft 33, and an essentially conical lower rotor portion 34. The rotor portions 32 and 34 are connected to one another by screws 35 and delimit a separation chamber 36. Alternative connecting organs may of course be used.

A further hollow shaft 37 extends into the rotor body 30 via the inside of the rotor shaft. The shaft 37 bears the screw conveyor 31 and they are connected to one another by screws 38. The hollow shaft 37 is drivingly connected to the screw conveyor 31 and is hereinafter called the conveyor shaft.

The screw conveyor 3 comprises a central core 39, which extends axially through the whole of the lower rotor portion, a sleeve-formed part 40 comprising a number of apertures 41 which are distributed round the axis of rotation R and extend axially from the upper portion of the screw conveyor 31 to the conical portion of the screw conveyor 31, a number of wings 42 which are distributed round the axis of rotation R and connect the core 39 to a central sleeve 43 situated at a radial distance from the axis of rotation R within the sleeve-formed part 40 of the screw conveyor 31, which central sleeve 43 changes to a conical portion and a lower support plate 44, and at least one conveying thread 45 which extends in a screw-like manner along the whole inside of the rotor body 30 from the latter's upper end to its lower end and is itself connected to the sleeve-formed part 40 and the core 39. The at least one conveying thread 45 may of course be supplemented by a suitable number of conveying threads, e.g. two, three or four, which all extend in a screw-like manner along the inside of the rotor body 30.

Wear resistant elements (not shown) may be spaced apart along the edge of the conveyor flight on the conveyor screw 45. The wear resistant elements may be distributed at a distance from each other, leaving intermediate parts, i.e. interspaces. Less number of wear resistant elements will reduce both the weight and in particular the moment of inertia as well as the total production time and cost of the screw conveyor. The distance between the wear resistant elements may vary depending on the circumstances. However, spacing the wear resistant elements too far apart may give an inadequate wear protection to the conveyor flight. In this case, the wear protection may be improved by simply reducing the distance between the wear resistant elements. The spacing of the wear resistant elements can be determined with regard to different aspects, such as the operational conditions of the screw conveyor 45 or the cost versus the durability of the screw conveyor 45.

An inlet pipe 46 for feeding motor lubricant oil which are to be treated in the rotor body 30 extends through the conveyor shaft 37 and leads on into the central sleeve 43. The inlet pipe 46 discharges axially before said wings 42 into a space centrally in the screw conveyor 31. Axially closer to the core 39, the core and the lower support plate 44 form a passage 47 which constitutes a continuation of the inlet channel which extends through the inlet pipe 46. The passage 47 is in communication with the inside of the rotor body 30 via channels between the wings 42.

Passages 47 may form a part of an inlet device 65 for gentle acceleration of the incoming liquid. Thus, the inlet pipe 46 may discharge at an inlet device 65, or distributor, that gently accelerates the liquid when guided via the passages 47 to the separation chamber. The inlet device may comprise a central conical receiving structure arranged around the axis of rotation R and comprising a central receiving zone for receiving the liquid mixture from the inlet pipe 4. The inlet device may further comprise inlet channels for directing the liquid mixture from said receiving zone to the separation chamber. The inlet channels may extend from the periphery of the receiving zone and spiral down the outer surface of said conical receiving structure. Thus, such channels may form the passages 47. An example of an inlet device is further shown in FIGS. 4-6 and discussed below.

A space in the form of an outlet chamber 48 is formed between the conveyor shaft 37 and an upper conical support plate 49. A paring disc 50 for discharging purified liquid is disposed within the outlet chamber 48. The paring disc 50 is firmly connected to the inlet pipe 46. An outlet channel 51 for the purified oil extends in an outlet pipe which surrounds the inlet pipe 46 and defines the liquid light phase outlet.

A centrally and axially directed outlet 52 for separated sludge, or solids, is arranged at the lower end of the rotor body 30, and defines the sludge outlet. In connection with this outlet 52 for dry phase, the rotor body 30 is surrounded by a device 53 for intercepting dry phase 54 which leaves the outlet 52. The dry phase 54 is disclosed in the drawings in the form of accumulations at the radially outer portion of the conveying thread 45, on the latter's side which faces towards the sludge outlet 52.

The rotor body 30 further comprises a stack of truncated conical separation discs 55 which are examples of surface-enlarging inserts. These are fitted coaxially with the rotor body 30 centrally in its cylindrical portion 32. The conical separation discs 55, which have their base ends facing away from the outlet 52 for the separated dry phase, are held together axially between the upper conical support plate 49 and the lower conical support plate 44 by the central sleeve 43 which extends through the stack of truncated conical separating discs 55. The separation discs 55 comprise holes which form channels 56 for axial flow of liquids when the separation discs 55 are fitted in the centrifugal separator. The upper conical support plate 49 comprises a number of apertures 57 which connect the space 58 situated radially within the stack of separation discs to the outlet chamber 51. Alternatively, the conical separation discs 55 may be so oriented that they have their base ends facing towards the outlet 52 for separated dry phase.

A further space in the form of an outlet chamber 59 for liquid heavy phase is formed between the conveyor shaft 37 and the outlet chamber 48 for liquid light phase (purified oil). A paring disc 60 for discharge of liquid heavy phase is arranged within this outlet chamber 59, wherein the paring disc 60 communicates with an outlet channel 61 for fluids, i.e. the liquid heavy phase outlet 61. The outlet channel 61 for higher density fluids extends in an outlet pipe which surrounds the outlet pipe and the outlet channel 51 for lower density fluids (purified oil).

The conveyor shaft 37 comprises a number of holes 62 which connect an annular space situated radially outside the stack of separation discs with the outlet chamber 59 for higher density fluids. The holes 62 are adapted to form an overflow outlet for fluids in the rotor body 30 which flow towards and out through the outlet for higher density fluids, in such a way that an interface level between higher density fluids and lower density fluids is maintained at a radial level (level not disclosed in FIG. 3) in the rotor body 30. The outlet described with the paring disc makes it possible for the centrifugal separator's outlet 61 for liquid heavy phase to be adapted to communicate with a collection device (such as a collection tank) which may be arranged at a distance from, and at a higher level than, the centrifugal separator (not disclosed in FIG. 3). Fluids are thus pumped out from the centrifugal separator to such a collection device through the paring disc.

The centrifugal separators described above functions in the following manner during rotation of the rotor body 30:

The separation aid is added to the contaminated motor lubricant oil before it enters the centrifugal separator 3. The addition of separation aid takes place via a mixer 6 or by means of a stirrer which provides optimum distribution of the separation aid in the fluid and good contact between the separation aid and the contaminating particles. The amount of separation aid added varies depending on the amount of oil which is to be cleaned and its degree of contamination.

The mixture of contaminated oil to be purified and separation aid is fed into the centrifugal separator 3, when the latter has been caused to rotate, via the inlet 46 to the separation chamber 36, putting the mixture into rotation and hence subjecting it to centrifugal force. The result is the gradual formation of a free liquid surface at level 63, the position of which is determined by the apertures 57.

Particles separated from the oil and sludge formed at the periphery of the rotor body is fed by the screw conveyor 31 axially towards the conical portion 34 of the rotor body 30 and proceed out through the sludge outlet 52.

The oil relieved of a plurality of particles by the separation aid is further fed through gaps 64 formed between the conical separating discs 55. The oil can thereby be further purified by not yet separated particles and separation aid depositing themselves on the separating discs 55 and being projected radially outwards, while the purified oil passes on radially inwards and out via the liquid light phase outlet 51. Contaminant particles and separation aid which have not formed a sludge phase but are still in a liquid phase are extracted via the liquid heavy phase outlet 61.

Figure 5:
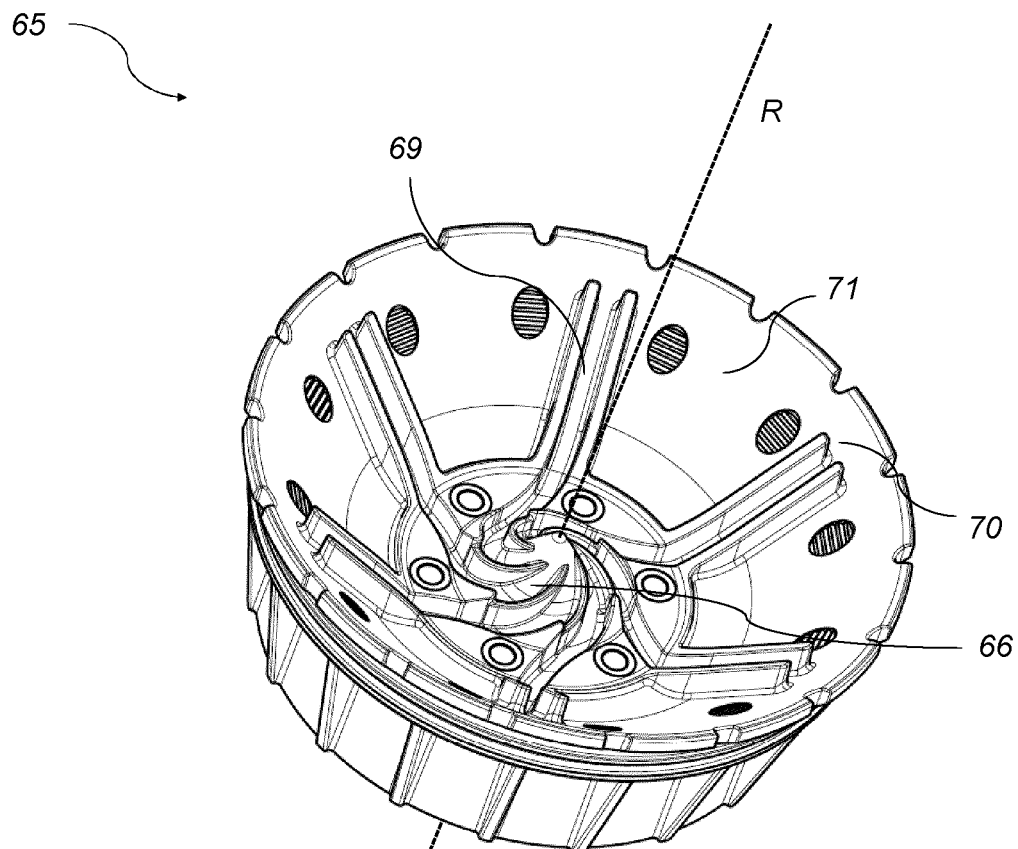
FIG. 5 shows a perspective view of an inlet device that may be used in the three-phase centrifugal separator of the system.
Figure 6:
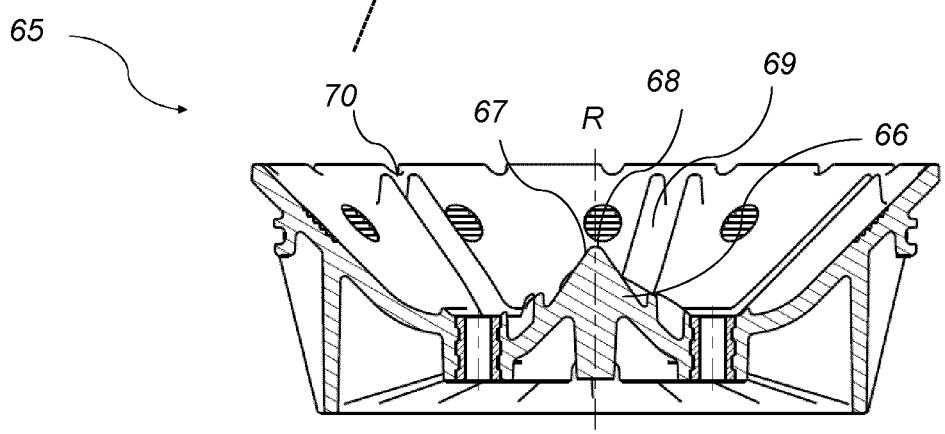
FIG. 6 shows a section view of an inlet device that may be used in the three-phase centrifugal separator of the system.

FIGS. 4-6 all show different views of an inlet device 65 according to an embodiment of the present invention. The inlet device 65 is rotatable around central rotational axis R as seen in FIG. 3. The inlet device 65 is shaped as a bowl with a central conical receiving structure 66 extending from the bottom of the bowl. The central conical receiving structure 66 has a rounded top, or apex, 68 and a receiving zone 67 encircles the top 68 of the conical receiving structure 200. Six different inlet channels 69 spirals down the outer sides of the conical receiving structure 200. The rotational direction of the centrifugal separator in which the inlet device 65 is intended to function is indicated by arrow $R_{sep}$ in FIG. 4a. $R_{sep}$ is in the counter-clockwise direction when the inlet device is viewed from the top (FIG. 4a) whereas the inlet channels 69 makes a twist, or spins, in the clock-wise direction from the top to bottom of the central conical receiving structure 66, i.e. in the opposite direction compared to the rotational direction $R_{sep}$ of the separator.

As seen in FIG. 4b, each inlet channel 69 extend from the receiving zone 67 with an angle α, which is the smallest angle formed between the tangent $T_a$ of the periphery of the receiving zone at the extension of the inlet channel 69 and the extension direction $D_{in}$ of the inlet channel 69.

In other words, α may also be defined as the angle between the extension of an inlet channel from the receiving zone and a tangent of the periphery of the central receiving zone when projected onto a plane orthogonal to R. Since the inlet channel does not extend in a straight direction, the direction at which the inlet channel extends is the direction of a tangent to the inlet channel extension at the "start" of the inlet channel, i.e. at the periphery of the receiving zone. α may be less than 90°, such as less than 45°. Furthermore, a may be between 15° and 45°, such as about 30°. It may be preferable to have a as small as possible, but it in practice it may depend on the manufacturing principles.

Consequently, each inlet channel 69 extends with a high angle of incidence.

Since the inlet channel extend in a curved direction, $D_{in}$ may be regarded as the tangent to the curve at the start of the inlet channel 69, i.e. at the periphery of the receiving zone 67. In this embodiment, each inlet channel 69 has twisted approximately a quarter of a full turn around the conical receiving structure 66 when reaching the bottom of the conical receiving structure 66.

The inlet channels 69 may be passages 47 as seen in FIG. 3.

The inlet channels 69 then continue in a straight radial direction from the bottom of the central conical receiving structure 66, up the inner sides of the bowl and ends in an inlet channel outlet 70. Consequently, each inlet channel is composed of two parts 69a, and 69b, with different directions. A twisted first part 69a that twists down the outer side of the conical receiving structure, and a straight part 69b, that extend substantially from the bottom of the central conical receiving structure to the inlet channel outlet 70 that is located near the periphery of the inlet device 65.

Each inlet channel 69 has a substantial constant width throughout the length of the inlet channel, and the sides 72 that form the "walls" of the different channels, i.e. the sides 72 that separates one inlet channel from another, extend from the surface with a height that is substantially equal to the width of each channel 69. The inlet channels 69 are equally spaced around the conical receiving structure 66 and the inlet channels 69 and sides 72 covers the entire outer area of the conical receiving structure 66.

Since the inlet device is shaped as a bowl, the part 69b of the inlet channel 69 that extends radially up the inner sides 71 of the bowl inclines upwards, as i.a. is seen in FIG. 6. In this way, the inlet channel outlet 70 is located at a location that is above the apex 68 of the central conical receiving structure.

When viewed from the top, as in FIG. 4a, the inlet device 65 has a substantial circular cross section, and the inlet channel 69 extend at the inlet channel outlet 70 in a direction $D_{out}$ that is substantially perpendicular to the tangent $T_b$ of the periphery of the circular cross section of the inlet device 65.

The invention claimed is:

1. A method for continuous purification of motor lubricant oil comprising:
    circulating lubricant oil between a motor lubricant oil tank and a motor;
    providing a pair of baffles in the lubricant oil tank to create a first portion having baffles and a second portion not having baffles;
    transporting contaminated lubricant oil from said motor lubricant oil tank in a cleaning loop, said transport in said cleaning loop comprising:
        supplying contaminated lubricant oil to a three-phase centrifugal separator from an inlet between a side of the lubricant oil tank and the pair of baffles;
        continuously separating contaminants in the separator and continuously discharging a first liquid phase comprising purified lubricant oil from a liquid light phase outlet of the separator, continuously discharging a second liquid phase comprising solid contaminants from a liquid heavy phase outlet of the separator and continuously discharging a sludge phase from a sludge outlet by the aid of a conveyor screw of the three-phase separator; and
        transporting said first liquid phase comprising purified oil back to the lubricant oil tank,
    wherein the transporting contaminated lubricant oil from the motor lubricant oil tank comprises withdrawing the contaminated lubricant oil from the first portion in the lubricant oil tank, and returning oil from the separator to the second portion of the lubricant oil tank, and
    wherein the circulating lubricant oil between the motor lubricant oil tank and the motor comprises withdrawing the lubricant oil from the second portion of the lubricant oil tank and returning oil through an outlet of the motor having a longitudinal axis located between the pair of baffles.

2. The method according to claim 1, wherein at least 50% of the solid contaminants are discharged in the second liquid phase from the liquid heavy phase outlet of the separator.

3. The method according to claim 2, further comprising adding at least one liquid separation aid to contaminated lubricant oil,
    wherein the at least one liquid separation aid comprises polyhydroxy alkoxylate with a density of 1.0-1.1 g/cm$^3$ at 40° C.

4. The method according to claim 3, further comprising adding at least one liquid separation aid to contaminated lubricant oil,
    wherein the step of adding at least one liquid separation aid to contaminated lubricant oil further comprises mixing the contaminated lubricant oil and the liquid separation aid before supply to the three-phase centrifugal separator.

5. The method according to claim 2, further comprising adding at least one liquid separation aid to contaminated lubricant oil,
    wherein the step of adding at least one liquid separation aid to contaminated lubricant oil comprises mixing the contaminated lubricant oil and the liquid separation aid before supply to the three-phase centrifugal separator.

6. The method according to claim 1, further comprising adding at least one liquid separation aid to contaminated lubricant oil,
    wherein the adding at least one liquid separation aid to contaminated lubricant oil comprises mixing the contaminated lubricant oil and the liquid separation aid before supply to the three-phase centrifugal separator.

7. The method according to claim 1, wherein a flow rate in the circulation of lubricant oil between the motor lubricant oil tank and the motor is more than 50 times higher than a flow rate in the cleaning loop.

8. The method according to claim 1, wherein the first liquid phase comprising purified oil is transported back to the lubricant oil tank near said second position.

9. The method according to claim 1, wherein the method is continuously carried out during running of the motor to which the lubricant oil tank is connected to.

10. The method according to claim 1, further comprising measuring a concentration of at least one additive that neutralizes acid contaminants within the motor lubricant oil, and if the concentration is below a predetermined value, then adding the at least one additive that neutralizes acid contaminants to the motor lubricant oil.

11. The method according to claim 1, further comprising filtering the oil supplied from the second portion of the lubricant oil tank to the motor with a filter.

12. The method according to claim 11, further comprising providing a first line from the filter to the first portion of the lubricant oil tank and a second line from the filter to the motor.

13. A system for continuous purification of motor lubricant oil, said system comprising:
    a lubricant oil tank, the lubricant oil tank having a first end and a second end spaced from the first end by a first distance;
    a pair of baffles provided in the lubricant oil tank to create a first portion having baffles and a second portion not having baffles;
    a motor;
    a three-phase centrifugal separator for separating contaminants from lubricant oil, said separator comprising a rotor enclosing a separation space with a stack of separating discs, a separator inlet for contaminated lubricant oil extending into said separation space, a liquid light phase outlet for purified lubricant oil extending from said separation space, a liquid heavy phase outlet extending from said separation space, and a conveyor screw enclosed in the rotor and arranged for conveying a sludge phase towards and out of a sludge outlet of the separator;
    a first line transporting contaminated lubricant oil from the first portion of the lubricant oil tank to the separator inlet and returning oil from the separator to the second portion of the tank, the first line having an inlet between a side of the lubricant oil tank and the pair of baffles; and a second line transporting lubricant oil from the second portion of the lubricant oil tank to the motor and returning oil from the motor through an outlet of the motor having a longitudinal axis located between the pair of baffles.

14. The system according to claim 13, wherein the motor has an effect of at least 1 MW.

15. The system according to claim 14, wherein the motor is a two stroke engine or a four stroke engine.

16. The system according to claim 13, further comprising a mixer for mixing a liquid separation aid to the contaminated oil upstream of the separator inlet.

17. The system according to claim 13, further comprising a filter for filtering the oil supplied from the second portion of the lubricant oil tank to the motor, a third line from the filter to the first portion of the lubricant oil tank and a fourth line from the filter to the motor.

* * * * *